April 16, 1963 I. K. DORTORT 3,086,165
SHOCKLESS AUTOMATIC TO MANUAL CHANGEOVER SYSTEM FOR REGULATORS
Filed June 27, 1958 2 Sheets-Sheet 1

INVENTOR.
ISADORE K. DORTORT.
BY Ostrolenk, Faber,
Gerb & Soffen
ATTORNEYS

April 16, 1963 I. K. DORTORT 3,086,165
SHOCKLESS AUTOMATIC TO MANUAL CHANGEOVER SYSTEM FOR REGULATORS
Filed June 27, 1958 2 Sheets-Sheet 2
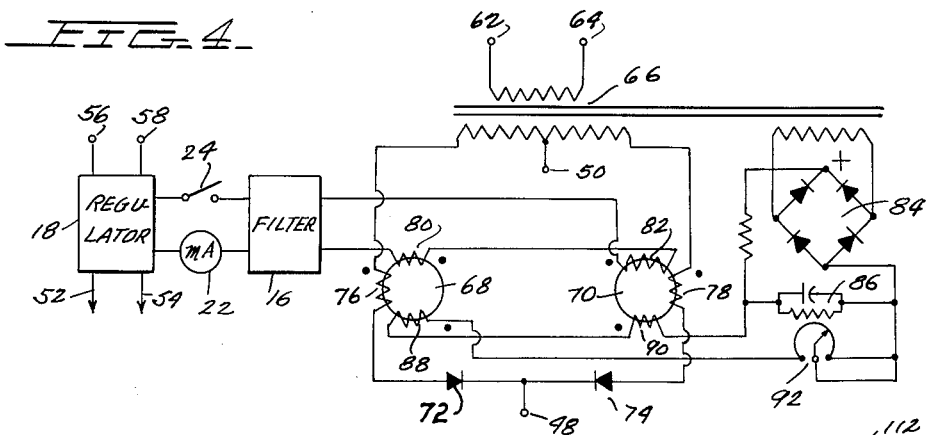
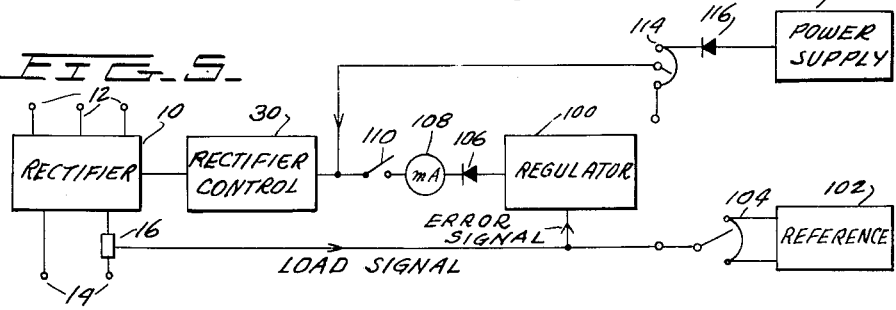
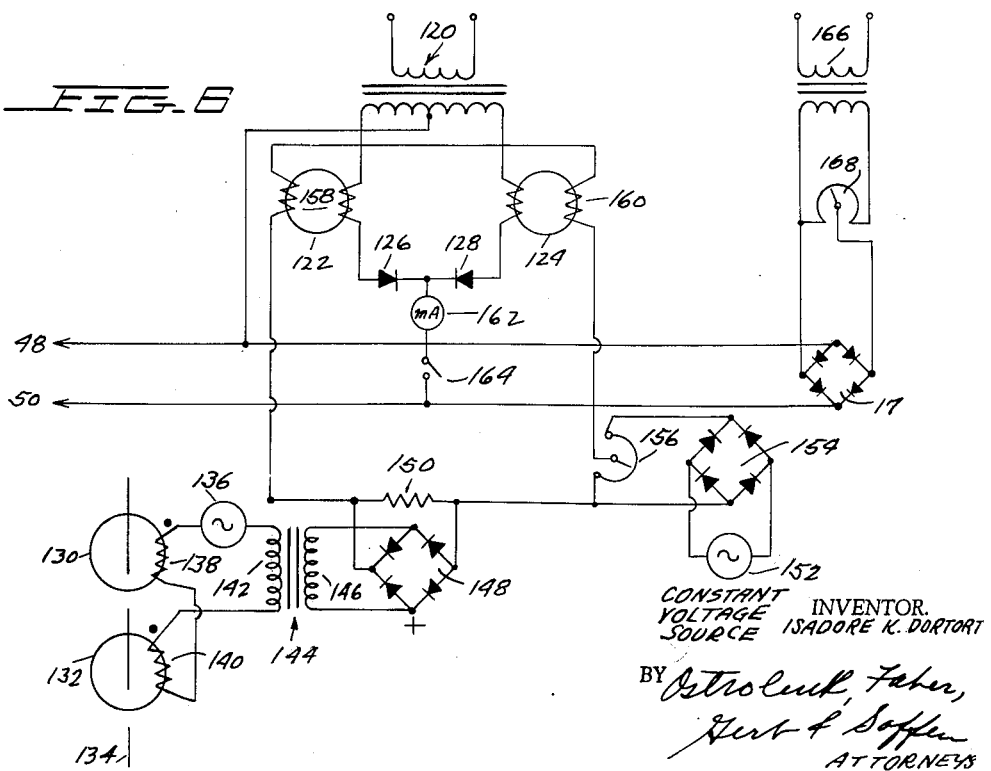
INVENTOR.
ISADORE K. DORTORT
ATTORNEYS

United States Patent Office

3,086,165
Patented Apr. 16, 1963

3,086,165
SHOCKLESS AUTOMATIC TO MANUAL CHANGE-
OVER SYSTEM FOR REGULATORS
Isadore K. Dortort, Philadelphia, Pa., assignor to I-T-E
Circuit Breaker Company, Philadelphia, Pa., a corporation of Pennsylvania
Filed June 27, 1958, Ser. No. 745,155
8 Claims. (Cl. 323—66)

My invention relates to a regulator system for electrical machines such as a rectifier wherein the regulator may be switched between automatic and manual operation without applying any shock to the system.

When electrical devices are under the control of a regulator means, it is often desirable that the machine be transferred from automatic operation to a manually controllable operation.

In the past, depending upon the speed of the regulator, the time constant of the machine control system and the time constant of the load to which the machine is connected, the output of the machine will change suddenly at the instant of changeover by an amount depending on the momentary change produced in the control power. This is true, even if the control power is not momentarily interrupted at the instant of changeover, as is generally the case. If the control power is momentarily interrupted, the load swings may be sufficiently severe to cause dangerous disturbances and to take the machine off the line. This problem is particularly severe when the machine energizes a high back E.M.F. load, and when the regulator is of the astatic type having a very steep characteristic.

The essence of my invention is to provide a novel system wherein the control signal delivered by the regulator is reduced to zero by control of amplifiers within the regulator control system, still maintaining the required control power to the machine, so that the output level of the machine is maintained constant. At this point, a changeover switch in the output circuit of the regulator may be operated without producing any shock on the system.

In one embodiment of my invention, the regulator is connected in series with an amplifier which may be of the magnetic amplifier type, and the output of the magnetic amplifier controls the machine being regulated, such as a rectifier. The magnetic amplifier bias is made adjustable whereby, when it is desired to switch from automatic to manual control, or from manual to automatic control, the magnetic amplifier bias is varied until the amplifier output maintains the machine output with a zero control signal being delivered from the regulator. At this point, a switch connected in the output of the regulator may be operated so as to be permit manual control of the machine.

In order to determine when the control signal current has decreased to zero, a measuring means such as an ammeter is placed in the circuit and is observed by operating personnel during the changeover operation.

Clearly, my novel changeover system may be located at many various points throughout an installation, such as at the machine, or from a remote control position, or both.

Accordingly, the primary object of this invention is to provide a novel changeover system for regulators.

Another object of this invention is to provide a novel system for regulators wherein regulator operation may be switched from manual to automatic without imposing a shock on the system being regulated.

Another object of my invention is to provide a novel control system for regulators wherein the regulator output is brought to zero while the operating level of the system being regulated is maintained constant, before the automatic regulator is switched from automatic to manual operation.

These and other objects of my invention will become apparent from the following description when taken in connection with the drawings, in which:

FIGURE 1 schematically illustrates a block diagram of a first embodiment of my invention.

FIGURE 2 schematically illustrates the operation of the regulator system of FIGURE 1.

FIGURE 4 illustrates the regulator control circuitry for the system of FIGURE 3.

FIGURE 5 schematically illustrates a second embodiment of my invention.

FIGURE 6 illustrates a specific type of circuit which operates in accordance with the embodiment of FIGURE 5.

Figure 1:
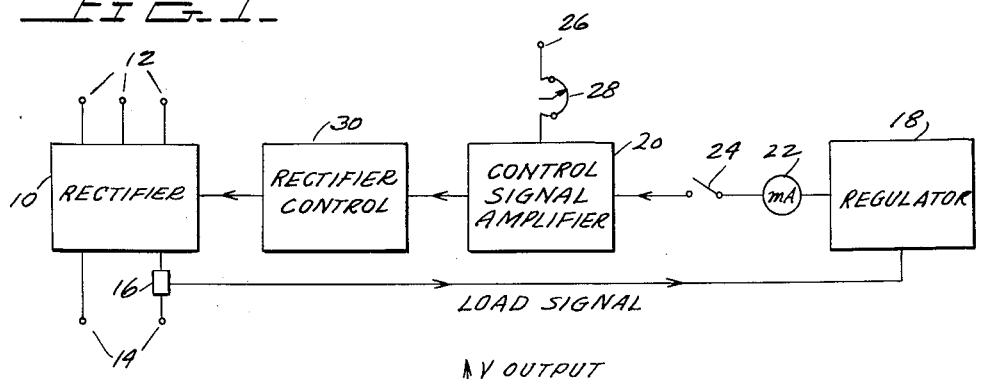

Referring now to FIGURE 1, my novel invention is set forth therein in conjunction with a regulator for a rectifier 10 which is connectible to a three-phase A.C. source at terminals 12 and to a D.-C. load at terminals 14. While FIGURE 1 shows the machine being regulated as a rectifier, it will be apparent to those skilled in the art that the machine could be any type of electrical device susceptible to regulation.

A current measuring means 16 is connected in the output of rectifier 10, it being assumed that the output current of rectifier 10 is to be maintained constant by my novel regulator system. Device 16 develops a signal related to the load output of the regulator, and the load signal is connected to the input of regulator 18.

Regulator 18 may be of any desired type, well known in the art, and contains a reference signal means (not shown) which will allow comparison of the load signal delivered from measuring means 16 to some preset predetermined value. Depending upon the difference in the reference signal and the load signal, the regulator 18 will deliver an output or a control signal to the control signal amplifier 20 through a milliammeter 22 and a control switch 24.

The control signal amplifier 20 may be of any desired type, and its operating level is controlled by an amplifier bias connected at terminal 26, and delivered to amplifier 20 through the potentiometer means 28 which adjusts the amplifier bias. The amplified control signal is finally connected to the rectifier control means 30 which, in turn, controls the output of rectifier 10.

As will be seen hereinafter, my novel invention resides in the use of the controllable bias adjusting means 28 of the amplifier 20 which operates in conjunction with current measuring means 22 and switch 24 to achieve shockless changeover from automatic regulation of rectifier 10 to manually controllable regulation of the rectifier.

Figure 2:
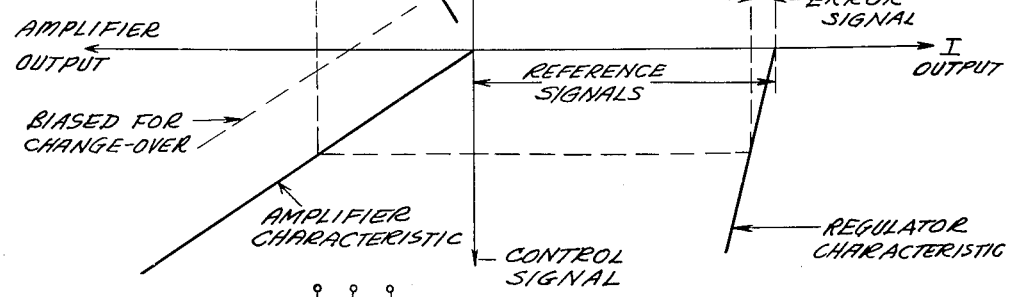

The operation of FIGURE 1 may be best understood by reference to the control characteristics of the various components of the system, as illustrated in FIGURE 2.

Referring to FIGURE 2, the first quadrant of the figure, or the upper right-hand quadrant, illustrates the output characteristic of rectifier 10 and the characteristic of the load connected to rectifier 10. Each of these characteristics show the load voltage as a function of the load current. The rectifier will, of course, stabilize at the intersection of these two characteristics, as illustrated.

The second quadrant, or upper left-hand quadrant of FIGURE 2, illustrates the control characteristic of rectifier 10, as determined by rectifier control means 30, and shows the rectifier output voltage at no load as a function of the input current to rectifier control means 30.

The third quadrant or lower left-hand quadrant illustrates the amplifier characteristic of control signal amplifier means 20 and shows the control signal amplifier output as a function of the control signal input.

The fourth quadrant, or lower right-hand quadrant, illustrates the characteristic of regulator 18 and shows the rectifier input load signal as a function of the output control signal of the regulator. In a practical astatic regulator, the error signal may represent a fraction of 1% of the load signal. The slope is exaggerated for clarity in FIGURE 2.

The system, as shown in FIGURE 1, is in a stable condition. The output current of the system is determined by the point at which the rectifier characteristic intersects the load characteristic, and this point determines the load signal input to the regulator characteristic. Thus, the intersection of the characteristics of quadrant 1 will determine the point at which regulator 18 is operated and the control signal delivered by the regulator (quadrant 4). The control signal of the regulator determines the amplifier output of control signal amplifier 20 (quadrant 3), and the point at which the control characteristic is operated is determined by the amplifier output (quadrant 2). Thus, the complete system as indicated by the closed, dotted line going from quadrants 1, 4, 3 and 2 and back to 1 determines the stable condition of the rectifier.

It will now be understood that if the regulator 18, under its automatic operating conditions, is suddenly switched off, then the control signal (quadrant 4) would be interrupted, thus causing a violent change in the output voltage of the rectifier.

The essence of my invention is to control means within the regulator system, such as the amplifier characteristic by controlling the input bias to the amplifier so as to decrease the output control signal of the regulator 18 smoothly to zero while still maintaining the output of the rectifier at a relatively constant value. Thus, as is seen in FIGURE 2, the amplifier characteristic of the third quadrant may be altered to the dotted line position by means of potentiometer 28 which controls the amplifier bias. As the amplifier characteristic is shifted to the dotted line value, the system will be maintained relatively stable with the output characteristic of the rectifier increasing to the dotted line of the first quadrant which corresponds to a zero output control signal from regulator 18. Thus, the output of the system increases by some relatively small amount, and by altering the amplifier characteristic as shown, the regulator output is zero and may be interrupted without any effect whatsoever on the system.

In operation, the operator, while adjusting potentiometer 28, will observe indicating means 22 until it registers a zero control signal output, and at that time the switch 24 may be safely opened, and the system converted from automatic to manual operation.

To reverse the operation and put the rectifier back on automatic control, the regulator 18 may be adjusted so that its setting agrees with the output of rectifier 10. The control switch 24 may then be closed with no control signal flowing immediately after closing the switch. The bias of control signal amplifier 20 may then be restored to its normal value, as shown in the solid line of FIGURE 2, and the automatic regulation will thereafter control the output of rectifier 10. Note that if it is not desirable to change the setting of the regulator, the output of the rectifier can be adjusted to the set value by varying the control signal output of control signal amplifier 20 through the bias control means 38.

Figure 3:
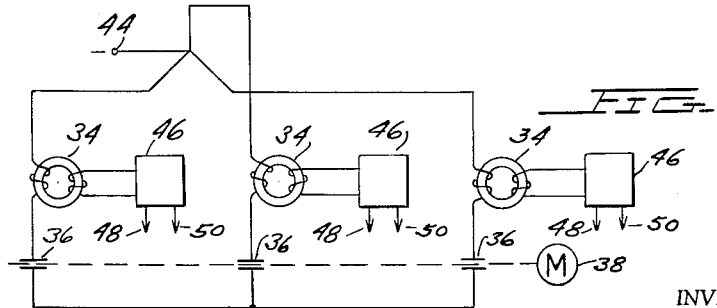
FIGURE 3 illustrates one type of rectifier to which my novel regulator system may be applied.

FIGURES 3 and 4 set forth more specific structures that could be utilized in the schematic diagram of FIGURE 1. Rectifier 10 is shown in FIGURE 3 as being a three-phase half-wave mechanical rectifier which is energized from a three-phase transformer 32. Each of the three phases of the rectifier include a respective commutating reactor 34 and a respective contact 36 connected in series. Contacts 36 are synchronously driven into and out of engagement by a synchronous motor 38 in the manner shown in U.S. Patent No. 2,759,141 issued August 14, 1956, entitled Regulator for Mechanical Rectifier in the name of Edward J. Diebold and assigned to the assignee of the instant invention. The contacts 36 are then connected together through a shunt 40 to a positive terminal 42. The negative terminal of the rectifier is taken from the neutral point of the Y connected secondary of transformer 32 as negative terminal 44.

In order to control the output voltage of the rectifier of FIGURE 3, each of commutating reactors 34 are provided with flux reversal circuit means schematically illustrated by blocks 46, which are connected to auxiliary windings of each commutating reactor. This flux reversal circuitry may be of any desired type. By way of example, one particular type of circuit which could be utilized in accordance with this invention is set forth in copending application Serial No. 423,357, now Patent No. 2,860,301, filed April 15, 1954, entitled Commutating Reactor Break Pre-Excitation for Mechanical Rectifiers in the name of Edward J. Diebold and assigned to the assignee of the instant invention. Clearly, the flux reversal circuitry contained within blocks 46 is equivalent to the rectifier control means 30 of FIGURE 1, and will determine the output voltage of the rectifier.

As indicated in each of blocks 46, the input to the flux reversal circuit is taken through terminals 48 and 50, and the circuitry connected to the input of flux reversal means 46 will be described more fully in conjunction with FIGURE 4. The shunt 40 is equivalent to the current measuring means 16 of FIGURE 1, and the signal delivered by the shunt is supplied over lines 52 and 54 to the regulator, as will be similiarly shown in FIGURE 4. Note that while FIGURE 3 shows this current measuring means as a shunt, any type of current measuring means, such as a transducer system, could have been utilized, as will be illustrated hereinafter in FIGURE 6.

Referring now to FIGURE 4 which shows the regulator means for the system of FIGURE 3, the regulator 18 which is energized from terminals 56 and 58 has its input connected to wires 52 and 54 which come from shunt 40 of FIGURE 3. Since regulator 18 is of any desired type, it is schematically shown in FIGURE 4 as a block.

Clearly, the regulator 18 will contain all of the normal equipment usually found in regulators, such as adjustable reference signal means which may be electrical or mechanical, and so on. The regulator 18 is connected to the filter 16 if one is needed, through the milliammeter 22 and changeover switch 24 which have been described in conjunction with FIGURE 4.

The control signal amplifier 20 of FIGURE 1 is seen in FIGURE 4 as comprised of a magnetic amplifier type device. The magnetic amplifier is comprised of an A.-C. input connected to terminals 62 and 64, a transformer 66, saturable reactors 68 and 70, and diodes 72 and 74. The magnetic amplifier is connected to be a full wave self-saturating type, and includes main windings 76 and 78 which are connected in series with the secondary winding of transformer 66 and the diodes 72 and 74 in the usual manner.

The output of magnetic amplifier is then connected to terminals 48 and 50 of the flux reversal circuits 46 of FIGURE 3, and is controlled by control windings 80 and 82 which are energized from regulator 18.

The magnetic amplifier bias is provided from single phase bridge connected rectifier 84 which has filter 86 as its output, and is connected in series with biasing windings 88 and 90 and the potentiometer 92. The potentiometer 92 is the equivalent of potentiometer 28 of FIGURE 1, and provides control of the magnetic amplifier bias to put it for normal automatic operation and so as to imitate the operation of the control signal conducted by control windings 80 and 82.

In operation, when it is desired to control the rectifier of FIGURE 3 manually instead of automatically, the bias of the magnetic amplifier of FIGURE 4 is adjusted by potentiometer 92 until the control signal conducted in windings 80 and 82 is zero, as indicated by milliammeter 22. At this time, switch 24 may be opened and the output of the regulator of FIGURE 3 may be thereafter controlled by the potentiometer 92, as has been previously described in conjunction with FIGURES 1 and 2.

The embodiment set forth heretofore has described my novel invention in conjunction with control of the control signal amplifier. It will, however, be apparent to those skilled in the art that this control can be applied to any component within the regulator system whereby the control signal delivered by the regulator is brought to zero without substantially affecting the operating level of the machine being regulated.

Another application of my novel principle is shown in the embodiment of FIGURES 5 and 6 where FIGURE 5 is a schematic diagram of the embodiment, while FIGURE 6 sets forth specific circuitry that could be utilized in the system of FIGURE 5. In FIGURE 5, the machine being regulated in the rectifier 10 of FIGURE 1 which has an output current measuring means 16 associated therewith. The regulator circuit is comprised of a regulator means 100 which has an error signal delivered thereto which is the difference between some reference signal delivered from reference signal output means 102 and potentiometer 104, and the load signal delivered from load measuring means 16. This error signal, as seen in FIGURE 5, is applied to the input of regulator 100 which delivers an output signal through a diode means 106, current measuring means 108 and control switch 110 to the rectifier control means 30 which may be identical to the rectifier control means of FIGURE 1.

Switch 110 is normally closed when the rectifier 10 is being automatically regulated from the regulator 100 so as to maintain some constant output parameter, as determined by the reference signal applied across potentiometer 104.

An auxiliary power supply means 112 which is connected to potentiometer 114 through diode means 116 is then directly connected to the rectifier control means 30 so that the output voltage of potentiometer 114 will be connected in parallel with the output voltage of regulator 100.

Since the two parallel connected voltage sources operate through diodes 106 and 116, the output voltage to rectifier control 30 will be the highest of these two voltages, as is well known in the art. Accordingly, when it is desired to operate rectifier 10 under automatic conditions, the switch 110 is closed, and the voltage across potentiometer 114 is reduced until it is lower than the smallest output voltage to be expected from regulator 100 so that power supply 112 will have no effect on the operation of the circuit.

When it is desired to switch from the automatic control to manual control, however, the potentiometer 114 is adjusted until the output voltage from power supply 112 to the rectifier control 30 exceeds the output voltage of regulator 100. Under this condition, the rectifier control will be completely responsive to the voltage across potentiometer 114 only. Accordingly, the switch 110 may be safely opened without causing any shock to the system being regulated.

As noted above, FIGURE 6 describes a specific circuit in which the general concept of the circuit of FIGURE 5 may be carried out. In FIGURE 6, the regulator 100 is comprised of a magnetic amplifier type of regulator which includes an A.-C. input voltage source comprised of transformer 120, transductors 122 and 124, and diodes 126 and 128.

The circuit of FIGURE 6 is applicable to the type of rectifier device of FIGURE 3 wherein terminals 48 and 50 of FIGURE 6 are connectable to terminals 48 and 50 of the flux reversal circuits of FIGURE 3.

In FIGURE 6 the input load signal is taken from a D.-C. transductor measuring system which includes transductors 130 and 132 which encircle one of the D.-C. output buses 134. It will be noted that FIGURE 6 differs from FIGURE 3 in this respect, since FIGURE 3 utilizes a shunt 40 for measuring the current. The transductor measuring system, as is illustrated in FIGURE 6, shows that any type of load measuring means may be utilized in accordance with this invention.

The transductor measuring system further includes an A.-C. source 136 which is connected in series with windings 138 and 140 of transductors 130 and 132 respectively and primary winding 142 of coupling transformer 144. Secondary winding 146 of transformer 144 is connected to a bridge connected rectifier 148 which develops a D.-C. voltage across resistor 150. Thus, the voltage imposed across resistor 150 is equivalent to the load signal derived from current measuring means 16 in FIGURE 5, and the voltage across resistor 150 will vary in accordance with the variation of the current flow through bus 134 which is at the output of the rectifier.

A reference voltage is then created by means of a constant voltage A.-C. source 152 which is rectified by rectifier 154, and then delivered to potentiometer 156. The two voltages across resistors 150 and 156 will be seen to be in opposing directions and from a closed circuit with control windings 158 and 160 of transductors 122 and 124 of the magnetic amplifier regulator.

Therefore, a control signal is developed for the magnetic amplifier which is dependent upon the comparison of a load signal to a reference signal, and the output at terminals 48 and 50 to the flux reversal circuits of FIGURE 3 will be controlled accordingly, under automatic regulating conditions.

The output of the regulator magnetic amplifier is seen in FIGURE 6 as being taken through a measuring means 162 and switch 164. During automatic operating conditions it is apparent that switch 164 (which is identical to switch 110 of FIGURE 5) will be closed. When it is now desired to switch to manual operation, the flux reversal circuit connected at terminals 48 and 50 will be connected to an auxiliary power supply 166 which is identical to power supply 112 of FIGURE 5.

Power supply 166 operates through potentiometer 168 and its output is rectified by rectifier 170 where rectifier 170 is identical in purpose to rectifier 116 of FIGURE 5.

As described heretofore in conjunction with FIGURE 5, the potentiometer 168 is varied until the output voltage of rectifier 170 exceeds the output voltage of the magnetic amplifier which includes diodes 126 and 128. Since the outputs of these two voltage sources are taken through diodes 170 for the auxiliary power supply, the output voltage at terminals 48 and 50 will be the voltage of the source having the highest voltage magnitude. Accordingly, when the output voltage of rectifier 170 exceeds that of the magnetic amplifier, the switch 164 may be opened without causing a shock in the circuit, since this circuit has lost control of the rectifier.

Accordingly, the novel concept of this invention is carried out in FIGURES 5 and 6 by providing an auxiliary means to take over the function of the regulator and thus cause the regulator output to lose control of the system whereby the system may now be safely switched from automatic to manual operation.

Clearly, when it is desired to reverse the process and go from manual operation to automatic operation, the switch 164 is closed and the voltage of potentiometer 168 will be decreased until such point that the output voltage of the magnetic amplifier is equal to the voltage of the auxiliary power supply. At this time the regulator will assume control of the system and the voltage of potentiometer 168 is further decreased to its lowest value so that it may not interfere with the normal operation of the automatic regulator system.

Although I have described preferred embodiments of my novel invention, many variations and modifications will now be obvious to those skilled in the art, and I prefer therefore to be limited not by the specific disclosure herein but only by the appended claims.

I claim:

1. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; manually operable control means for adjusting the regulation characteristic of said regulator system and for manually energizing said output parameter control means independently of said regulator; a means for rendering the connection between said regulator and said output parameter control means ineffective; said manually operable means for adjusting said regulator characteristic being operable to reduce said output signal generated by said regulator means to a zero value; said means for rendering the connection between said regulator and said output parameter control means ineffective being operable when said regulator means output signal is zero without imparting a shock to said electrical device; said output of said electrical device being thereafter under the control of said manually operable control means.

2. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; a manually operable control means for adjusting the regulation system and for manually energizing said output parameter control means independently of said regulator; a means for rendering the connection between said regulator and said output parameter control means ineffective; and a means for measuring the said output signal of said regulator means; said manually operable means for adjusting said regulator characteristic being operable to reduce said output signal generated by said regulator means, as indicated by said measuring means, to a zero value; said means for rendering the connection between said regulator and said output parameter control means ineffective being operable when said regulator means output signal is zero without imparting a shock to said electrical device; said output of said electrical device being thereafter under the control of said manually operable control means.

3. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; manually operable control means for adjusting the regulation characteristic of said regulator system and for manually energizing said output parameter control means independently of said regulator; a means for rendering the connection between said regulator and said output parameter control means ineffective; said manually operable means for adjusting said regulator characteristic being operable to reduce said output signal generated by said regulator means to a zero value; said means for rendering the connection between said regulator and said output parameter control means ineffective being operable when said regulator means output signal is zero without imparting a shock to said electrical device; said output of said electrical device being thereafter under the control of said manually operable control means; said means for rendering the connection between said regulator and said output parameter control means ineffective comprising a switch.

4. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; a manual control means for manually energizing said output parameter control means independently of said regulator; a means for rendering the connection between said regulator and said output parameter control means ineffective; and a means for adjusting the regulation characteristic of said regulator system; said means for adjusting said regulator characteristic being operated until said output signal generated by said regulator means is at a predetermined value; said means for rendering the connection between said regulator and said output parameter control means ineffective being operable when said regulator means output signal is at said predetermined value without imparting a shock to said electrical device; said output of said electrical device being thereafter under the control of said manual control means; said regulator having a rectifier means connected in the output thereof; said means for rendering the connection between said regulator and said output parameter control means ineffective comprising a rectified voltage source connected in parallel with said regulator rectifier means.

5. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; a manual control means for manually energizing said output parameter control means independently of said regulator; a means for rendering the connection between said regulator and said output parameter control means ineffective; and a means for adjusting the regulation characteristic of said regulator system; said regulator having a rectifier means connected in the output thereof; said means for rendering the connection between said regulator and said output parameter control means ineffective comprising a rectified voltage source connected in parallel with said regulator rectifier means.

6. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; a manual control means for manually energizing said output parameter control means independently of said regulator; a means for rendering the connection between said regulator and said output parameter control means ineffective; and a means for adjusting the regulation characteristic of said regulator system; said regulator having a rectifier means connected in the output thereof; said means for rendering the connection between said regulator and said output parameter control means ineffective comprising a rectified voltage source connected in parallel with said regulator rectifier means; said electrical device being under the control of said regulator when the output voltage of said regulator is higher than the output voltage of said rectified voltage source; said system being converted to manual control by said rectified voltage source when the output voltage of said regulator is lower than the output voltage of said rectified voltage source.

7. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; manually operable control means for adjusting the regulation characteristic of said regulator system and for manually energizing said output parameter control means independently of said regulator; a means for rendering the connection between said regulator and said output parameter control means ineffective; said manually operable means for adjusting said regulator characteristic being operable to reduce said output signal generated by said regulator means to predetermined a value; said means for rendering the connection between said regulator and said output parameter control means ineffective being operable when said regulator means output signal is at said predetermined value without imparting a shock to said electrical device; said output of said electrical device being thereafter under the control of said manually operable control means; said means for adjusting said regulator characteristic comprising an amplifier means connected in series with said regulator mean for amplifying the output signal of said regulator means; said amplifier means having bias means associated therewith for controlling the characteristic of said amplifier; said bias means being adjustable to maintain a substantially constant output signal to said electrical device output control means while said output of said regulator is decreased to said predetermined value; adjustment of said bias after said regulator is rendered ineffective comprising the manual control for said electrical device.

8. In an automatic to manual change-over system for a regulator system; said regulator system being connectable to control the output of an electrical device and comprising an output parameter measuring means, and an automatic regulating means; said electrical device having an output parameter control means associated therewith; said output parameter measuring means being connected to the input of said regulator means; said regulator means generating an output control signal dependent upon its input; said output control signal being connected to said output parameter control means of said electrical device to control the output of said electrical device; a manually operable control means for adjusting the regulation system and for manually energizing said output parameter control means independently of said regulator; a means for rendering the connection between said regulator and said output parameter control means ineffective; and a means for measuring the said output signal of said regulator means; said manually operable means for adjusting said regulator characteristic being operable to reduce said output signal generated by said regulator means, as indicated by said measuring means, to a zero value; said means for rendering the connection between said regulator and said output parameter control means ineffective being operable when said regulator means output signal is zero without imparting a shock to said electrical device; said output of said electrical device being thereafter under the control of said manually operable control means; said means for adjusting said regulator characteristic comprising an amplifier means connected in series with said regulator means for amplifying the output signal of said regulator means; said amplifier means having bias means associated therewith for controlling the characteristic of said amplifier; said bias means being adjustable to maintain a substantially constant output signal to said electrical device output control means while said output of said regulator is decreased to zero; adjustment of said bias after said regulator is rendered ineffective comprising the manual control for said electrical device.

References Cited in the file of this patent
UNITED STATES PATENTS

| | | |
|---|---|---|
| 2,677,084 | Carleton | Apr. 27, 1954 |
| 2,752,556 | Webb et al. | June 26, 1956 |
| 2,871,430 | Fox | Jan. 27, 1959 |
| 2,875,393 | Loeffler | Feb. 24, 1959 |